United States Patent [19]

Gabelli

[11] Patent Number: 4,761,082
[45] Date of Patent: Aug. 2, 1988

[54] ROLLER BEARING

[75] Inventor: Antonio Gabelli, Ijsselstein, Netherlands

[73] Assignee: SKF Industrial Trading and Development Company, B.V., Nieuwegein, Netherlands

[21] Appl. No.: 39,466

[22] Filed: Apr. 16, 1987

[30] Foreign Application Priority Data

Apr. 21, 1986 [NL] Netherlands .................. 8601017

[51] Int. Cl.⁴ ............... F16C 33/74; F16C 33/82; F16J 15/40
[52] U.S. Cl. ................. 384/133; 277/80; 384/446; 384/484
[58] Field of Search ............... 384/130–133, 384/143, 145–148, 445, 446, 448, 462, 470, 477, 478, 481–484, 486, 488, 490, 624; 277/80

[56] References Cited

U.S. PATENT DOCUMENTS

| | | | |
|---|---|---|---|
| 3,071,385 | 1/1963 | Greiner | 384/484 |
| 4,043,612 | 8/1977 | Orcutt | 384/133 X |
| 4,171,818 | 10/1979 | Moskowitz et al. | 277/80 |
| 4,309,040 | 1/1982 | Pierrat | 277/80 |
| 4,531,846 | 7/1985 | Raj | 384/133 X |
| 4,628,384 | 12/1986 | Raj et al. | 384/478 X |

FOREIGN PATENT DOCUMENTS 205018 10/1985 Japan .................. 384/477

Primary Examiner—John Petrakes
Assistant Examiner—Thomas R. Hannon
Attorney, Agent, or Firm—Rosen, Dainow & Jacobs

[57] ABSTRACT

A rolling bearing comprising at least one outer and one inner race situated coaxially therein and a row of rolling members situated in a space between these races and first and second seals for sealing the space between the races off from the outside surroundings on either side of the rolling members, to prevent a lubricant present from escaping to the outside and to prevent foreign matter from penetrating into the space from outside, the first seal being generally annular and the second seal comprises a sealing lip that is in communication with one of the races and having an inwardly directed side which rests springily against the other race, the first annular seal having an end portion that lies behind the inwardly directed side of the sealing lip, at a short distance from the other race thereby defining first, open, slot-shaped annular space between the seals and the said inner race and which space contains a quantity of magnetic fluid, and a magnet forming a magnetic field whereby such fluid is held within the slot-shaped annular space.

7 Claims, 1 Drawing Sheet

U.S. Patent     Aug. 2, 1988     4,761,082
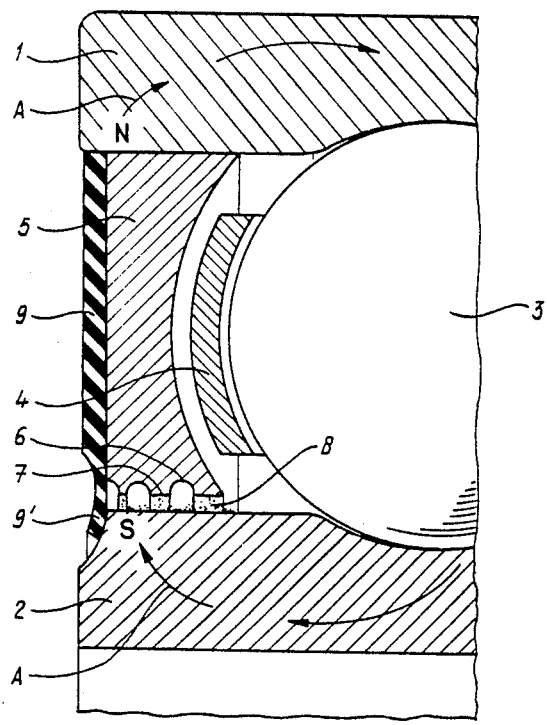

ROLLER BEARING

The invention concerns a rolling bearing comprising at least one outer race and at least one inner race situated coaxially therein, and at least one row of rolling members situated in the annular space between these races, and seals for sealing the annular space between the races off from the surroundings on either side of the rolling members, to prevent a lubricant present in this space from escaping to the outside and, on the other hand, to prevent any foreign matter from penetrating into the annular space from the outside, at least one of which seals is generally annular and comprises at least one sealing lip which is in communication with one of the races and rests springily against the other race. Such a rolling bearing is generally known.

In rolling bearings of this type the problem arises that during rotation of an element supported by such a bearing, for example a shaft, the temperature within the bearing increases with respect to the ambient temperature, whereby the air, particularly the vapor in the lubricant, inside the bearing expands with the result that the sealing lip is pressed outward and no longer has a sealing contact with the race concerned against which the lip rests springily, so that the seal is broken and the comparatively vaporous lubricant leaks out of the bearing to the outside. Then if the bearing cools down again air may be drawn in from the outside and impurities, for example in the form of dust particles, may be carried along which may have a failure-producing effect on the bearing. This phenomenon, which is called "breathing" of the bearing, is the main cause of leakage of the lubricant from the bearing despite the seals used.

The object of the invention is to procure a rolling bearing of the type mentioned wherein this phenomenon does not occur.

This object is accomplished in that in the rolling bearing pursuant to the invention the annular seal has an end portion that lies behind the inwardly directed side of the sealing lip at a short distance from the said other race, and the slot-shaped annular space thus formed between the seal and the said race contains a quantity of magnetic fluid, where means forming a magnetic field are present, whereby such fluid is held within the slot-shaped annular space.

In a rolling bearing designed in this way the seal obtained by the magnetic fluid withstands any difference in vapor pressure between the inner side of the bearing and the surroundings, so that the sealing lip always remains in sealing contact with the race concerned, and, on the other hand, the magnetic fluid is protected against penetration into it from the outside of impurities which may be detrimental to a good sealing effect of such fluid. By this means, therefore, leakage due to "breathing" of the bearing is no longer possible.

The means for formation of a magnetic field are advantageously formed by an annular magnet of which one pole is situated near the outer peripheral area and the other pole near the inner peripheral area of the ring. In this connection, such annular magnet is preferably formed by the annular seal, the sealing lip being attached to the said ring.

The bearing may be further improved in that a plurality of slot-shaped annular spaces, situated one behind the other in axial direction, are present, which spaces are separated from one another by open annular spaces having a greater depth.

Since in a bearing pursuant to the invention a complete seal from the surroundings is obtained, where periodic exchanges of air or vapor between the surroundings and the inner side of the bearing are thus unable to occur, the annular space between the races, in addition to the lubricant, may advantageously contain an inert gas instead of air, whereby oxidation of the lubricant and components of the bearing is prevented.

A magnetic fluid is known per se and consists of a colloidal suspension of extremely small particles, in the order of magnitude of 7-10 $\mu$m, of a material having paramagnetic properties, usually magnetized, in a fluid consisting mostly of a hydrocarbon, these particles being clad with a thin layer of a material that prevents flocculation of the particles. The particles normally move constantly in the fluid as a result of thermal agitation and Brownian movement, but when such a magnetic fluid is located in a magnetic field the particles orient themselves in essentialy one direction, whereby the fluid acts like soft iron.

It is noted further that U.S. Pat. No. 4,043,612 discloses that a magnetic lubricant may be used in a bearing design where such lubricant is placed under pressure during rotation by a pumping action obtained by means of grooves, and such lubricant, upon standstill of the bearing, is held within the bearing by means of a magnetic field.

The invention is described in detail with reference to the drawing, wherein a portion of the rolling bearing pursuant to the invention is shown in axial cross section.

As illustrated in the drawing, the rolling bearing comprises an outer race 1 and an inner race 2 situated coaxially therein, and a row of rolling members 3 situated in the annular space between these races, which are kept apart by a cage 4. The annular space between the races 1 and 2 is sealed off from the surroundings by the sealing rings 5 which are designed as magnets with the north and south poles indicated. In the end portion of the sealing ring 5 directed toward the inner race 2 is provided a plurality of grooves 6, so that between these grooves are formed ridges 7 which lie at a short distance from the inner race 2. The slot-shaped annular spaces thus formed between the sealing ring 5 and the inner race 2 contain a quantity of magnetic fluid 8, which fluid is held in these slot-shaped spaces by the magnetic field formed by the sealing ring 5, the lines of force of said magnetic field being indicated by the arrows A.

To the sealing ring 5 is attached a seal 9 having a sealing lip 9', which lip 9' rests springily against the outer race 1. The seal 9 is preferably formed of a self-lubricating elastomeric material so that only very little friction will occur between the sealing lip 9' and the inner race 2 upon rotation of one of the races 1, 2.

I claim:

1. A rolling bearing comprising at least one outer race and at least one inner race situated coaxially therein, both races defining an annular space therebetween, and at least one row of rolling members situated in the annular space between these races and first and second seals for sealing the annular space between the races off from the outside surroundings on either side of the rolling members, to prevent a lubricant present in this space from escaping to the outside and to prevent foreign matter such as dust particles, water or similar impurities from penetrating into the annular space from outside, at least the first of said seals being generally annular and the second of said seals comprising at least one generally flat radially extending sealing lip that is in communication with one of the races and said sealing lip having an axially inwardly directed side which resiliently rests against the other race, the first annular seal having an end portion that lies behind and engages the inwardly directed side of the sealing lip of the second seal and at a short distance from the said other race thereby defining a first, open, slot-shaped annular space between the seals and the said inner race, said first slot-shaped space containing a quantity of magnetic fluid, and magnetic means forming a magnetic field to hold said fluid within the first slot-shaped annular space.

2. A rolling bearing according to claim 1, wherein a plurality of second slot-shaped annular spaces situated one behind the other in an axial direction are formed in the end of said first annular seal, and separated from one another by said first open annular space having a greater depth in the axial direction.

3. A rolling bearing according to claims 1 or 2, wherein the first seal is ring shaped having outer and inner peripheral areas, the magnetic means comprising an annular magnet of which one pole is situated near the outer peripheral area and the other pole near the inner peripheral area of the first sealing ring.

4. A rolling bearing according to claim 3, wherein the annular magnet is formed by the first sealing ring and the sealing lip is attached to said sealing ring.

5. A rolling bearing according to claims 1 or 2, wherein the annular space between the races contains an inert gas in addition to the lubricant.

6. A rolling bearing according to claim 1, wherein the sealing lip provides non-magnetic sealing against the inwardly directed side which resiliently rests against the outer race.

7. A rolling bearing according to claim 1, characterized in that the first and second seals abut each other.

* * * * *